US012587432B2

(12) United States Patent
Cohen et al.

(10) Patent No.: US 12,587,432 B2
(45) Date of Patent: Mar. 24, 2026

(54) VISUAL MAP FOR NETWORK ALERTS

(71) Applicant: ServiceNow, Inc., Santa Clara, CA (US)

(72) Inventors: Shay Cohen, Sydney (AU); Lilach Izikovich, Petah Tikva (IL); Rani Tzur, Petah Tikva (IL); Maayan Wigelman, Petah Tikva (IL); Noy Shpatz, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 15 days.

(21) Appl. No.: 18/666,106

(22) Filed: May 16, 2024

(65) Prior Publication Data

US 2025/0358169 A1 Nov. 20, 2025

(51) Int. Cl.
H04L 41/0604 (2022.01)
H04L 41/0659 (2022.01)
H04L 41/16 (2022.01)

(52) U.S. Cl.
CPC ...... H04L 41/0613 (2013.01); H04L 41/0659 (2013.01); H04L 41/16 (2013.01)

(58) Field of Classification Search
CPC .. H04L 41/0613; H04L 41/0659; H04L 41/16
See application file for complete search history.

(56) References Cited

U.S. PATENT DOCUMENTS 4,941,084 A 7/1990 Terada
5,185,860 A 2/1993 Wu 5,237,518 A 8/1993 Sztipanovits
5,261,097 A 11/1993 Saxon
5,265,252 A 11/1993 Rawson, III
5,367,685 A 11/1994 Gosling
5,390,297 A 2/1995 Barber
(Continued)

FOREIGN PATENT DOCUMENTS

CN 109739909 B 3/2023
EP 0433979 A2 6/1991
(Continued)

OTHER PUBLICATIONS

Big Panda, Events to Incidents Lifecycle, last accessed Feb. 1, 2024, https://docs.bigpanda.io/docs/events-to-incidents-lifecycle.
(Continued)

*Primary Examiner* — Brian J. Gillis
*Assistant Examiner* — Juan C Turriate Gastulo
(74) *Attorney, Agent, or Firm* — MCDONNELL BOEHNEN HULBERT & BERGHOFF LLP

(57) ABSTRACT

Example embodiments may include obtaining first data indicating a first service degradation in a network, and obtaining second data indicating a second service degradation in the network, identifying a field that is associated with the first data and the second data. Based on the field, determining a relationship between the first data and the second data and generating a representation of a user interface including the first data, the second data, and the relationship, wherein the user interface includes toggles that control display of a plurality of fields associated with the first data and the second data including the field.

20 Claims, 9 Drawing Sheets

(56) References Cited

U.S. PATENT DOCUMENTS

| | | | |
|---|---|---|---|
| 5,442,791 A | 8/1995 | Wrabetz | |
| 5,452,415 A | 9/1995 | Hotka | |
| 5,522,042 A | 5/1996 | Fee | |
| 5,533,116 A | 7/1996 | Vesterinen | |
| 5,655,081 A | 8/1997 | Bonnell | |
| 5,659,736 A | 8/1997 | Hasegawa | |
| 5,671,412 A | 9/1997 | Christiano | |
| 5,696,701 A | 12/1997 | Burgess | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Scarpelli | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 | 8/2006 | Keller | |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,328,260 B1 | 2/2008 | Muthiyan | |
| 7,412,502 B2 | 8/2008 | Fearn | |
| 7,505,872 B2 | 3/2009 | Keller | |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,840,490 B1 | 11/2010 | Sellers | |
| 7,877,783 B1 | 1/2011 | Cline | |

| | | | |
|---|---|---|---|
| 7,890,869 B1 | 2/2011 | Mayer | |
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,725,647 B2 | 5/2014 | Disciascio | |
| 9,049,105 B1* | 6/2015 | Feinstein | H04L 41/069 |
| 9,053,460 B2 | 6/2015 | Gilbert | |
| 9,069,737 B1 | 6/2015 | Kimotho | |
| 9,122,602 B1* | 9/2015 | Jewell | H04L 41/0631 |
| 9,971,826 B1 | 5/2018 | Belmar | |
| 10,673,963 B1 | 6/2020 | Feiguine | |
| 10,749,943 B1 | 8/2020 | Feiguine | |
| 10,771,344 B2 | 9/2020 | Bitterfeld | |
| 10,824,650 B2 | 11/2020 | Bar Oz | |
| 10,944,654 B2 | 3/2021 | Rimar | |
| 10,999,152 B1 | 5/2021 | Bar Oz | |
| 11,025,481 B1 | 6/2021 | Louca | |
| 11,089,115 B2 | 8/2021 | Garty | |
| 11,095,506 B1 | 8/2021 | Erblat | |
| 11,275,580 B2 | 3/2022 | Tamir | |
| 11,277,475 B1 | 3/2022 | Tal | |
| 11,281,442 B1 | 3/2022 | Tal | |
| 11,294,666 B1 | 4/2022 | Look | |
| 11,296,922 B2 | 4/2022 | Leibkowiz | |
| 11,301,503 B2 | 4/2022 | Burli | |
| 11,379,089 B2 | 7/2022 | Goswami | |
| 11,451,573 B2 | 9/2022 | Waplington | |
| 11,470,107 B2 | 10/2022 | Waplington | |
| 11,582,106 B2 | 2/2023 | Hameiri | |
| 11,616,690 B2 | 3/2023 | Feiguine | |
| 11,630,717 B2 | 4/2023 | Vutukuru | |
| 11,632,303 B2 | 4/2023 | Bitterfeld | |
| 11,640,369 B2 | 5/2023 | Bhogle | |
| 11,671,444 B2 | 6/2023 | Waplington | |
| 11,695,641 B2 | 7/2023 | Bar Oz | |
| 11,829,233 B2 | 11/2023 | Watkins | |
| 11,868,593 B2 | 1/2024 | Bradley | |
| 12,045,201 B1* | 7/2024 | Satish | G06F 16/283 |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 | 4/2005 | Izzo | |
| 2006/0026453 A1 | 2/2006 | Frost | |
| 2006/0095461 A1 | 5/2006 | Raymond | |
| 2006/0179058 A1 | 8/2006 | Bram | |
| 2006/0288053 A1 | 12/2006 | Holt | |
| 2006/0293942 A1 | 12/2006 | Chaddha | |
| 2007/0033279 A1 | 2/2007 | Battat | |
| 2007/0188494 A1 | 8/2007 | Agutter | |
| 2007/0288389 A1 | 12/2007 | Vaughan | |
| 2008/0133289 A1 | 6/2008 | Armour | |
| 2008/0148253 A1 | 6/2008 | Badwe | |
| 2008/0319779 A1 | 12/2008 | Hughes | |
| 2009/0088875 A1 | 4/2009 | Baier | |
| 2009/0228984 A1 | 9/2009 | Sterin | |
| 2010/0110932 A1 | 5/2010 | Doran | |
| 2013/0283273 A1 | 10/2013 | Miyazaki | |
| 2014/0122427 A1 | 5/2014 | Dary | |
| 2018/0123940 A1 | 5/2018 | Rimar | |
| 2018/0308001 A1* | 10/2018 | Doddala | H04L 41/16 |
| 2019/0073257 A1 | 3/2019 | Dasgupta | |
| 2019/0104398 A1 | 4/2019 | Owen | |
| 2019/0129739 A1 | 5/2019 | Al Reza | |
| 2019/0149515 A1 | 5/2019 | Sharma | |
| 2019/0165957 A1 | 5/2019 | Abbott | |
| 2019/0342162 A1 | 11/2019 | Bendre | |
| 2020/0034462 A1 | 1/2020 | Narayanasamy | |
| 2020/0050689 A1 | 2/2020 | Tal | |
| 2020/0204443 A1 | 6/2020 | Bar Oz | |

(56)                    References Cited

U.S. PATENT DOCUMENTS

| | | | |
|---|---|---|---|
| 2020/0301678 A1 | 9/2020 | Burman | |
| 2020/0409780 A1* | 12/2020 | Balasubramanian | ........................ |
| | | | G06F 9/3838 |
| 2021/0097168 A1 | 4/2021 | Patel | |
| 2021/0194764 A1 | 6/2021 | Badyan | |
| 2022/0222066 A1* | 7/2022 | Franzen | .................... G06F 8/70 |
| 2022/0303352 A1 | 9/2022 | Herzog | |
| 2023/0017653 A1* | 1/2023 | Xie | ......................... H04L 41/00 |
| 2023/0229542 A1 | 7/2023 | Watkins | |
| 2025/0030615 A1* | 1/2025 | Khaparkar | .............. H04L 43/20 |

FOREIGN PATENT DOCUMENTS

| | | | |
|---|---|---|---|
| EP | 1607824 | A2 | 12/2005 |
| WO | 9934285 | W | 7/1999 |
| WO | 0052559 | W | 9/2000 |
| WO | 0179970 | W | 10/2001 |

OTHER PUBLICATIONS

CA Technologies, CA Service Operations Insight, 2013.
ServiceNow, Washington DC IT Operations Management, last accessed Apr. 1, 2024.

\* cited by examiner

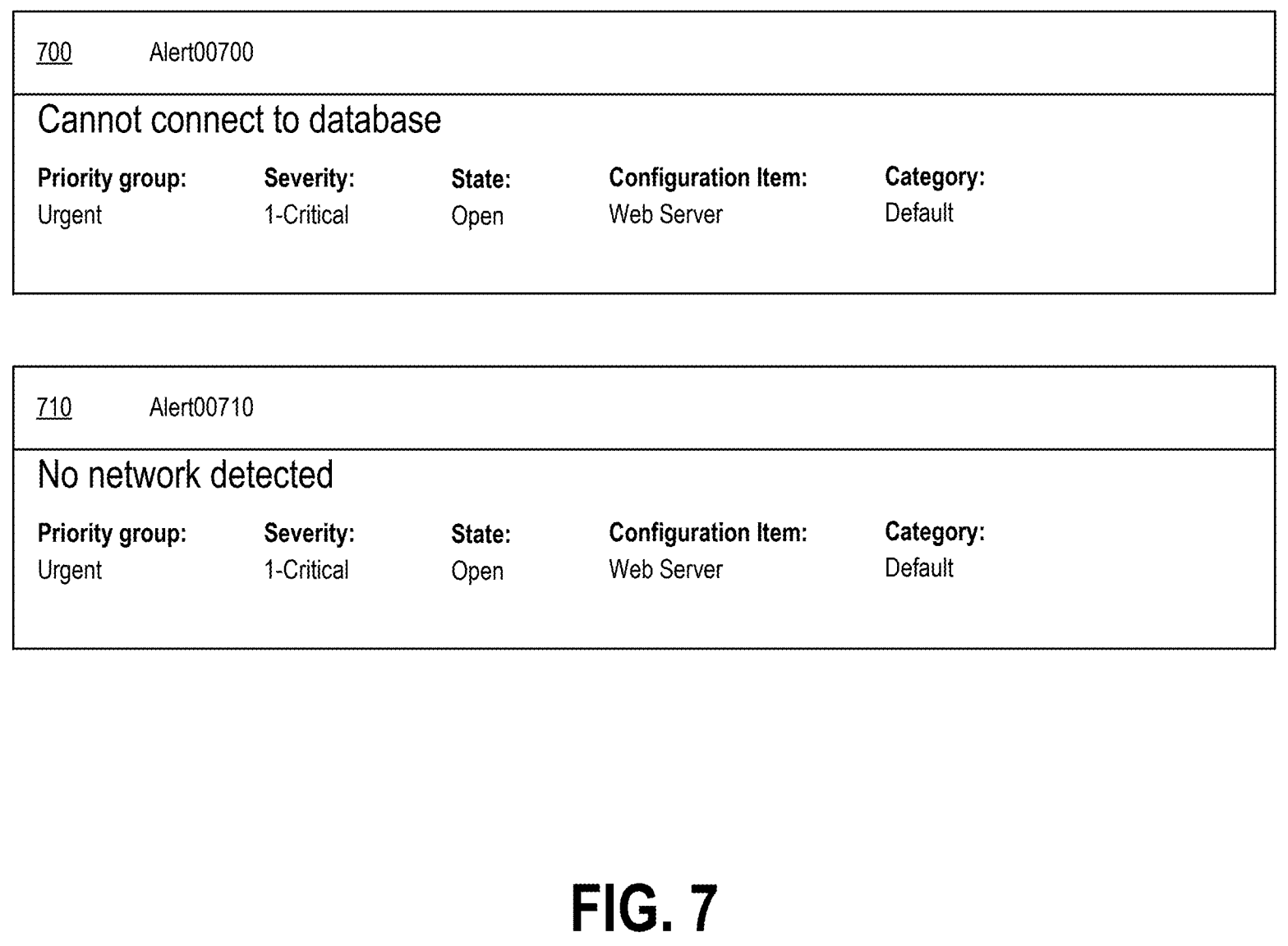

700   Alert00700

Cannot connect to database

Priority group:          Severity:          State:          Configuration Item:          Category:
Urgent                      1-Critical             Open               Web Server                     Default 710   Alert00710

No network detected

Priority group:          Severity:          State:          Configuration Item:          Category:
Urgent                      1-Critical             Open               Web Server                     Default

FIG. 7

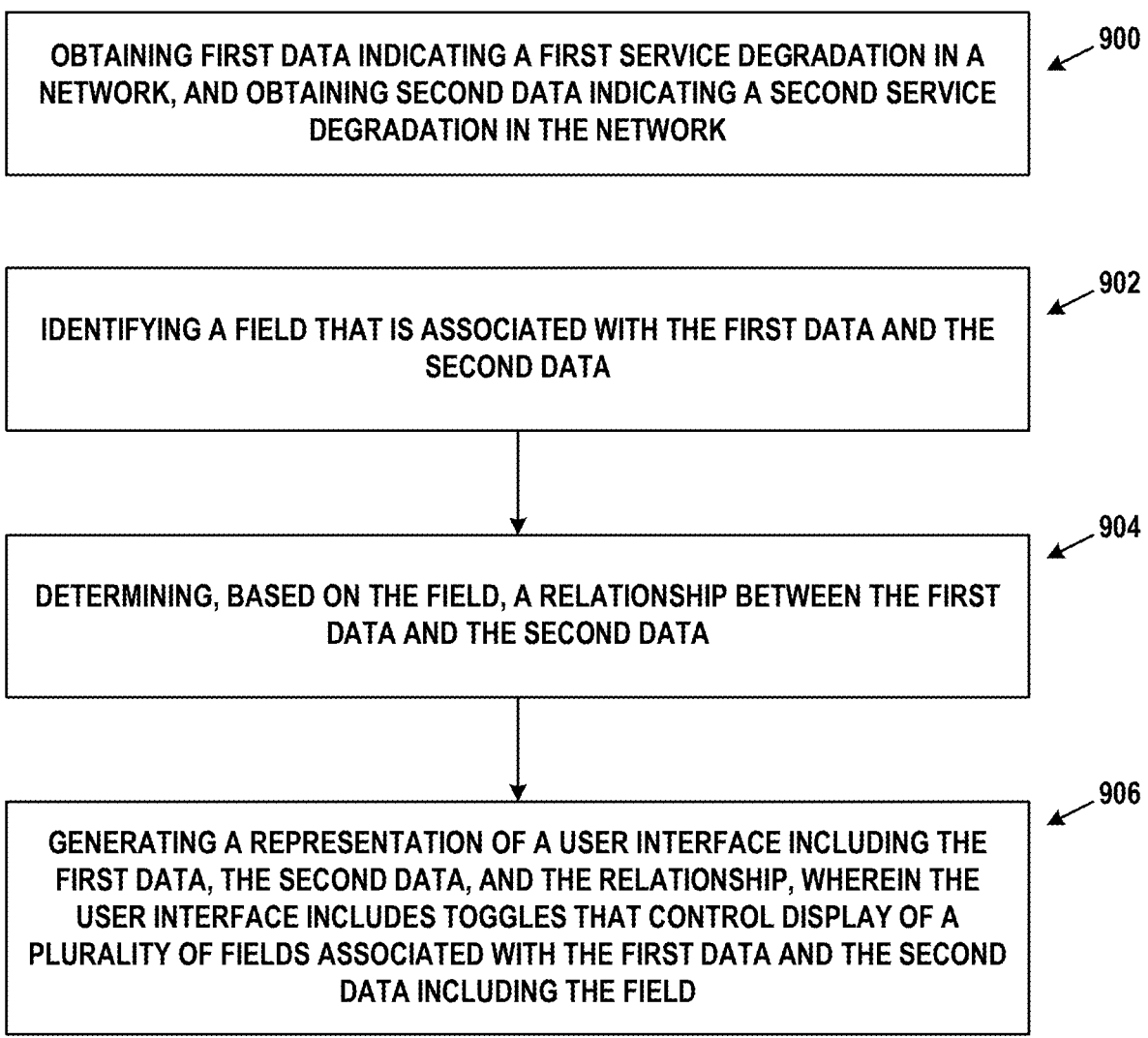

OBTAINING FIRST DATA INDICATING A FIRST SERVICE DEGRADATION IN A NETWORK, AND OBTAINING SECOND DATA INDICATING A SECOND SERVICE DEGRADATION IN THE NETWORK

900

IDENTIFYING A FIELD THAT IS ASSOCIATED WITH THE FIRST DATA AND THE SECOND DATA

902

DETERMINING, BASED ON THE FIELD, A RELATIONSHIP BETWEEN THE FIRST DATA AND THE SECOND DATA

904

GENERATING A REPRESENTATION OF A USER INTERFACE INCLUDING THE FIRST DATA, THE SECOND DATA, AND THE RELATIONSHIP, WHEREIN THE USER INTERFACE INCLUDES TOGGLES THAT CONTROL DISPLAY OF A PLURALITY OF FIELDS ASSOCIATED WITH THE FIRST DATA AND THE SECOND DATA INCLUDING THE FIELD

VISUAL MAP FOR NETWORK ALERTS

BACKGROUND

When a managed network generates a large volume of alerts (e.g., hundreds or thousands per day), it can be challenging to determine how these alerts relate to each other and/or which attributes are shared between the alerts. In a managed network of thousands of devices, each operating multiple software applications to provide dozens of services, it can be difficult to manage the large number of alerts. For example, parsing a large number of alerts to quickly and efficiently handle source issues (e.g., root causes) might not be possible. Further, generating interrelated alerts can be difficult and problematic. As a result, managing alerts may take longer and more resource-intensive than desired.

SUMMARY

Modern enterprise networks, and other types of networks and databases, are often actively managed. One aspect of this management is to map the physical and logical topology of the managed network's devices. These devices and/or software programs may be configured to transmit alert messages to a centralized location when they detect a problem—for example, an alert that a device is no longer connected to the internet. However, some managed networks may not have fully mapped topology, and/or may be large and complex, such that they generate many alerts. In both cases, as well as in other examples, it may be difficult to quickly parse alerts, assess relationships and interdependencies between alerts, and/or efficiently respond to multiple alerts from a network.

Various implementations disclosed herein include systems and methods for generating a visual map for network alerts. Each alert may have data attributes associated with it, such as an alert severity, an alert source, a tag for the alert, etc. The visual map may provide a visual representation of each alert and a visual representation of one or more relationships between different alerts. For example, if a first alert indicates a first device is no longer connected to a server, and a second alert indicates a second device is no longer connected to the same server, a visual map could show a link or relationship between the two alerts to indicate that the disconnection of each device is relates to the same server, suggesting that the server may be the root cause of the issue. In some cases, the visual map may include configuration data (e.g., from a configuration management database) to compile and better represent information about different alerts and their underlying systems. In some implementations, the visual map of alerts may be rendered before a configuration management database is fully established. Thus, in addition to representing how alerts relate to each other, visual maps may also better represent how alerts relate to underlying systems and configurations of the network.

By highlighting relationships and/or shared attributes between alerts, improved understanding of interdependencies and/or causalities, and more efficient troubleshooting, may be possible. For example, root cause analysis may be more easily assessed by a link in the visual map between two alerts to determine a shared problem causing both alerts. The visualization of alerts by way of visual maps may result in more efficient and/or less-compute intensive analysis, faster incident response times, less service and system downtime, and a more systematic and consistent approach to alert management.

Accordingly, a first example embodiment may involve obtaining first data indicating a first service degradation in a network, and obtaining second data indicating a second service degradation in the network; identifying a field that is associated with the first data and the second data; determining, based on the field, a relationship between the first data and the second data; and generating a representation of a user interface including the first data, the second data, and the relationship, wherein the user interface includes toggles that control display of a plurality of fields associated with the first data and the second data including the field.

A second example embodiment may involve a non-transitory computer-readable medium, having stored thereon program instructions that, upon execution by a computing system, cause the computing system to perform operations in accordance with any of the previous example embodiments.

In a third example embodiment, a computing system may include at least one processor, as well as memory and program instructions. The program instructions may be stored in the memory, and upon execution by the at least one processor, cause the computing system to perform operations in accordance with any of the previous example embodiments.

In a fourth example embodiment, a system may include various means for carrying out each of the operations of any of the previous example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts two alerts, in accordance with example embodiments.

FIG. 9 is a flow chart, in accordance with example embodiments.

DETAILED DESCRIPTION

Figure 1:
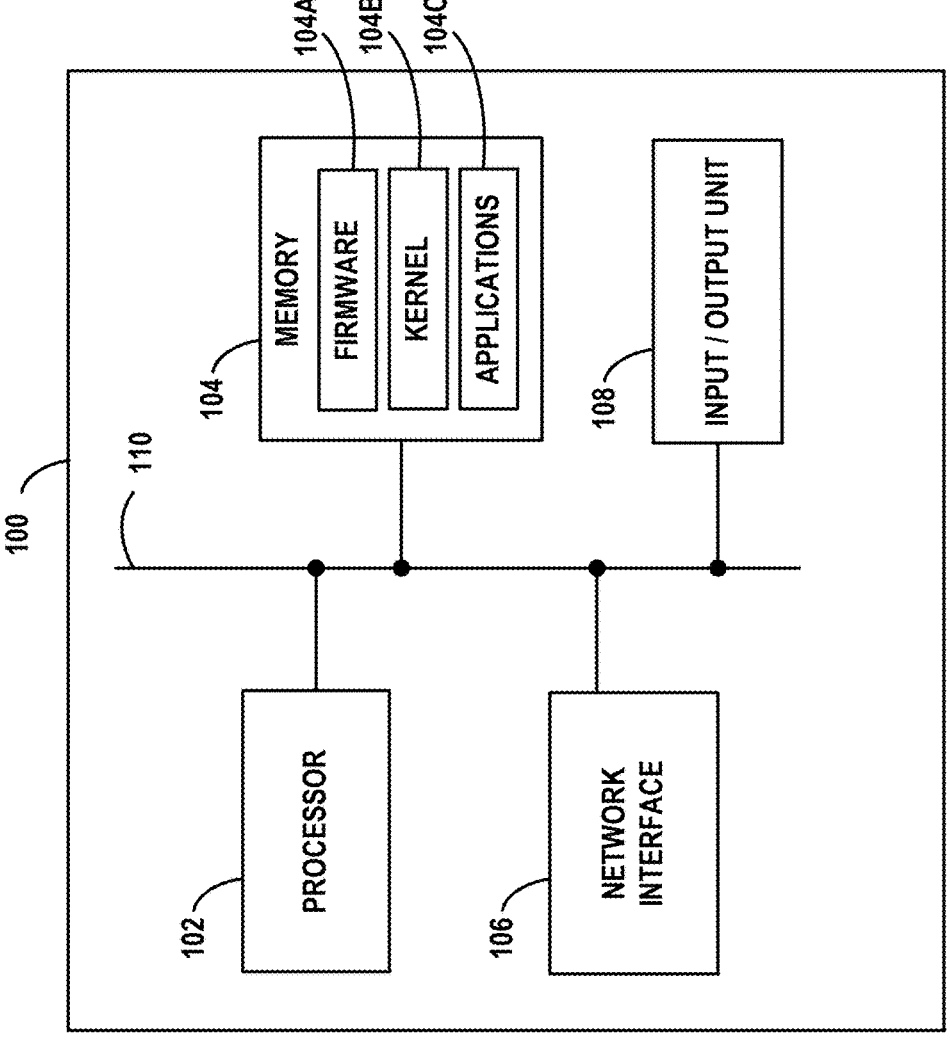
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Technical Improvements

These embodiments provide a technical solution to a technical problem. One technical problem being solved is the inefficient parsing and processing of alerts from a network to determine relationships therebetween. In practice, this is problematic because inefficient responses to alerts and their underlying incidents may result in degraded services and outages persisting in a network or system for longer than is necessary or desirable.

In other techniques, alerts may be presented as lists or in spreadsheets, with various attributes listed for each alert. However, these techniques do not enable rapid evaluations of relationships and/or shared attributes between alerts, much less facilitate a systematic approach to responding to alerts and/or assessing root causes. Moreover, these techniques rely on subjective decisions and experiences of users who receive lists of alerts without information about how they are related to each other or related to associated systems, which leads to wildly varying outcomes from instance to instance. Thus, these techniques did little if anything to address the inefficient parsing and processing of alerts.

The embodiments herein overcome these limitations by generating visual maps of alerts and shared attributes between them to determine relationships and independencies. In this manner, the parsing and processing of alerts can be accomplished in a more accurate and robust fashion. This results in several advantages. First, the visualization of alerts by way of visual maps may result in more efficient and/or less-compute intensive analysis of the alerts and relationships between alerts. Second, the visualization of alerts by way of visual maps may result in a more systematic and consistent approach to alert management. Third, the visualization of alerts by way of visual maps may result in faster incident response times, resulting in service degradations and outages with shorter durations.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist, including but not limited to metadata-based encodings of web components, and various uses of JAVASCRIPT® Object Notation (JSON) and/or extensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), another form of co-processor (e.g., a mathematics or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Data Over Cable Service Interface Specification (DOCSIS), or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
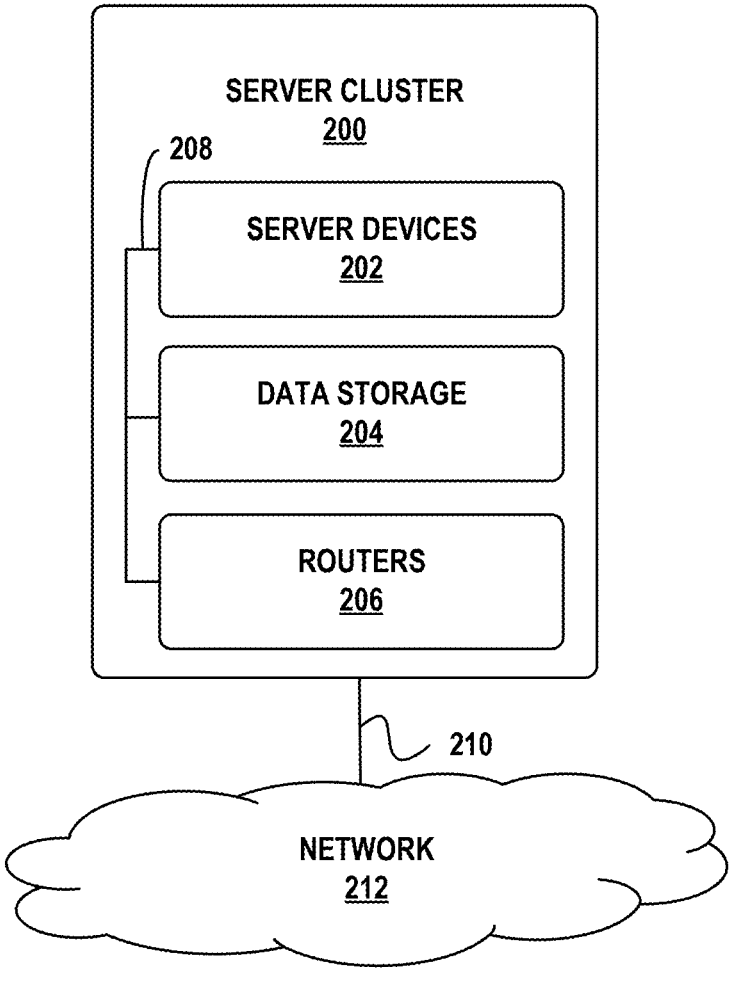
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
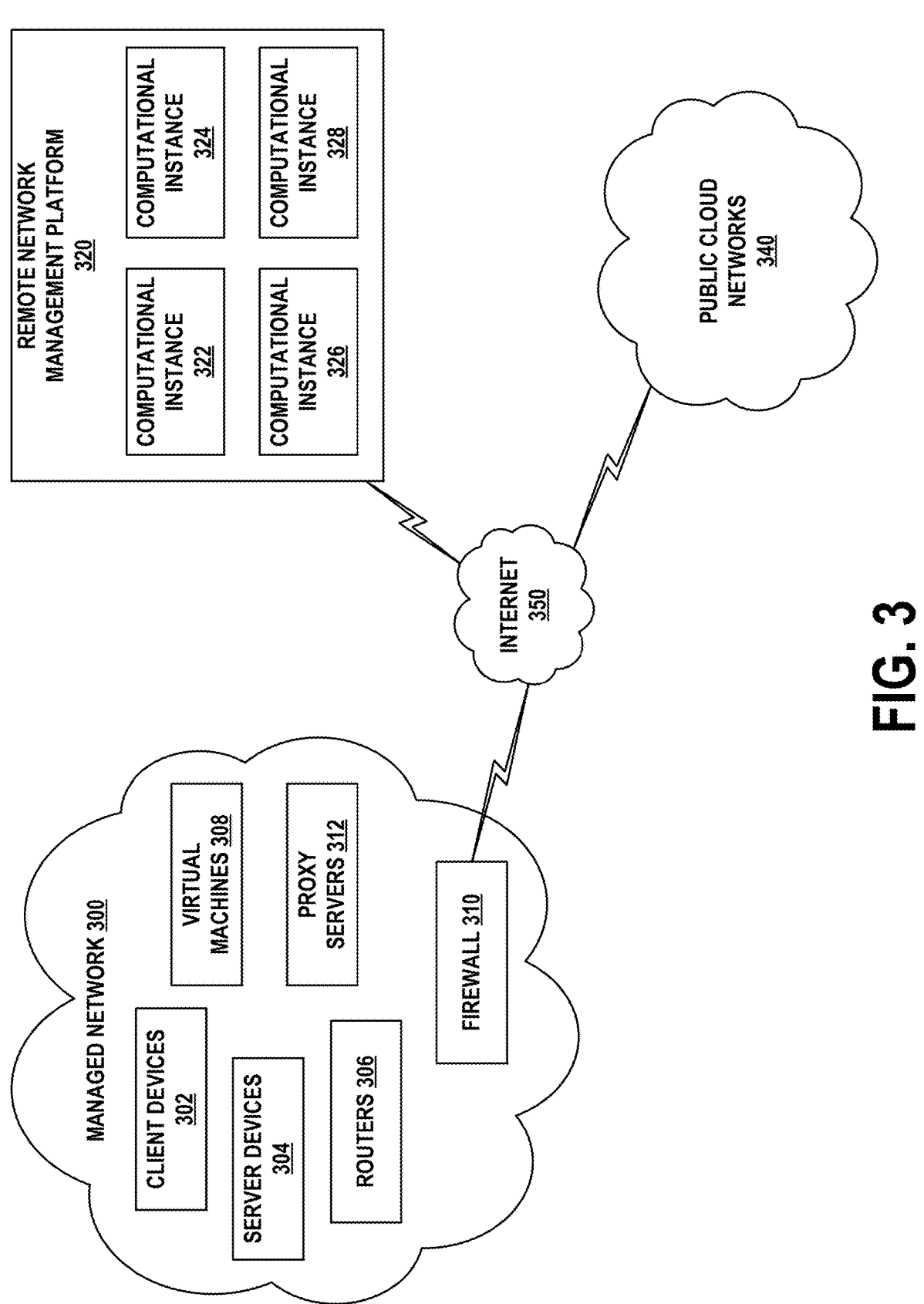
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
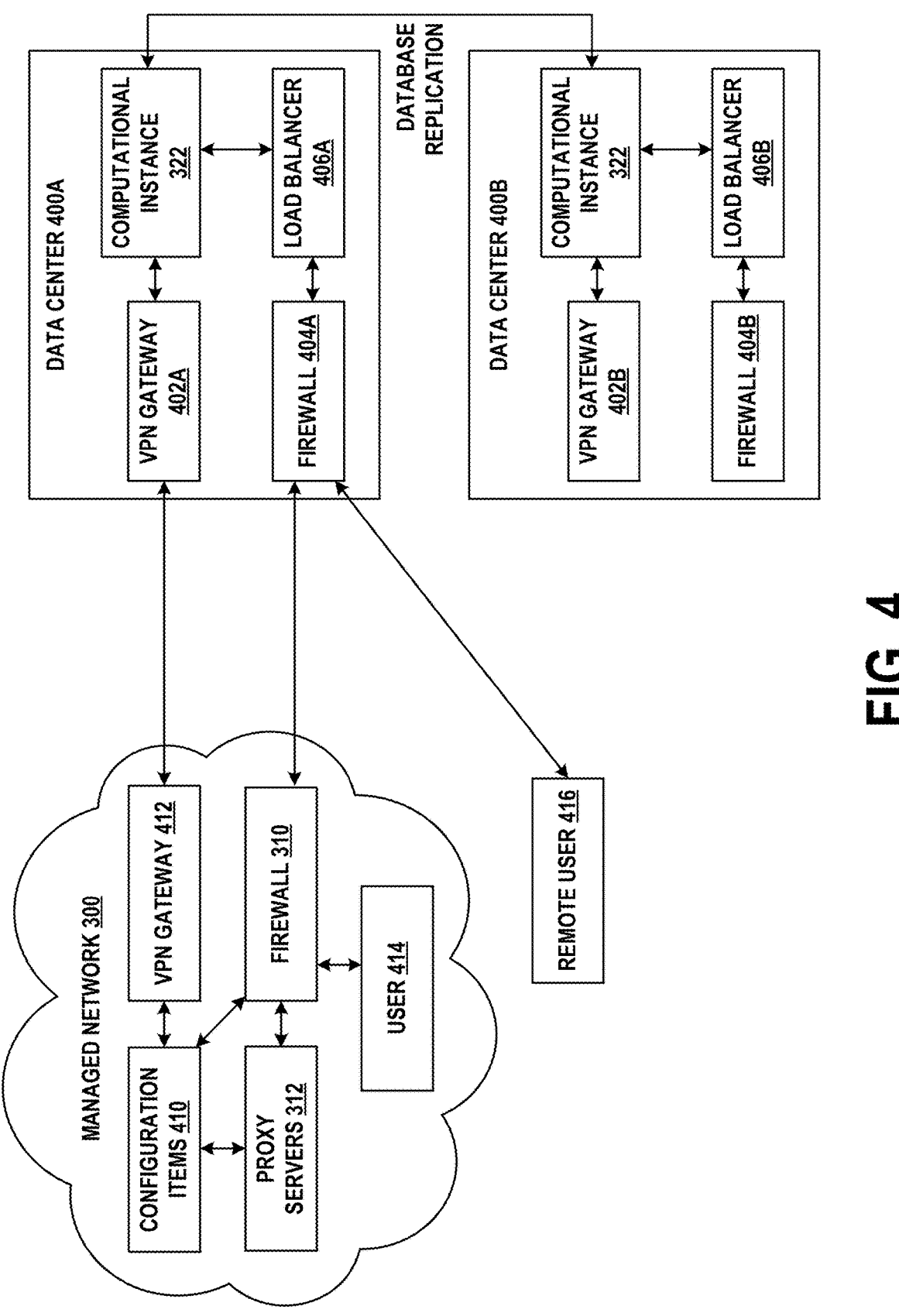
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of "server" may inherit all attributes from a configuration item class of "hardware" and also include further server-specific attributes. Likewise, a configuration item class of "LINUX® server" may inherit all attributes from the configuration item class of "server" and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
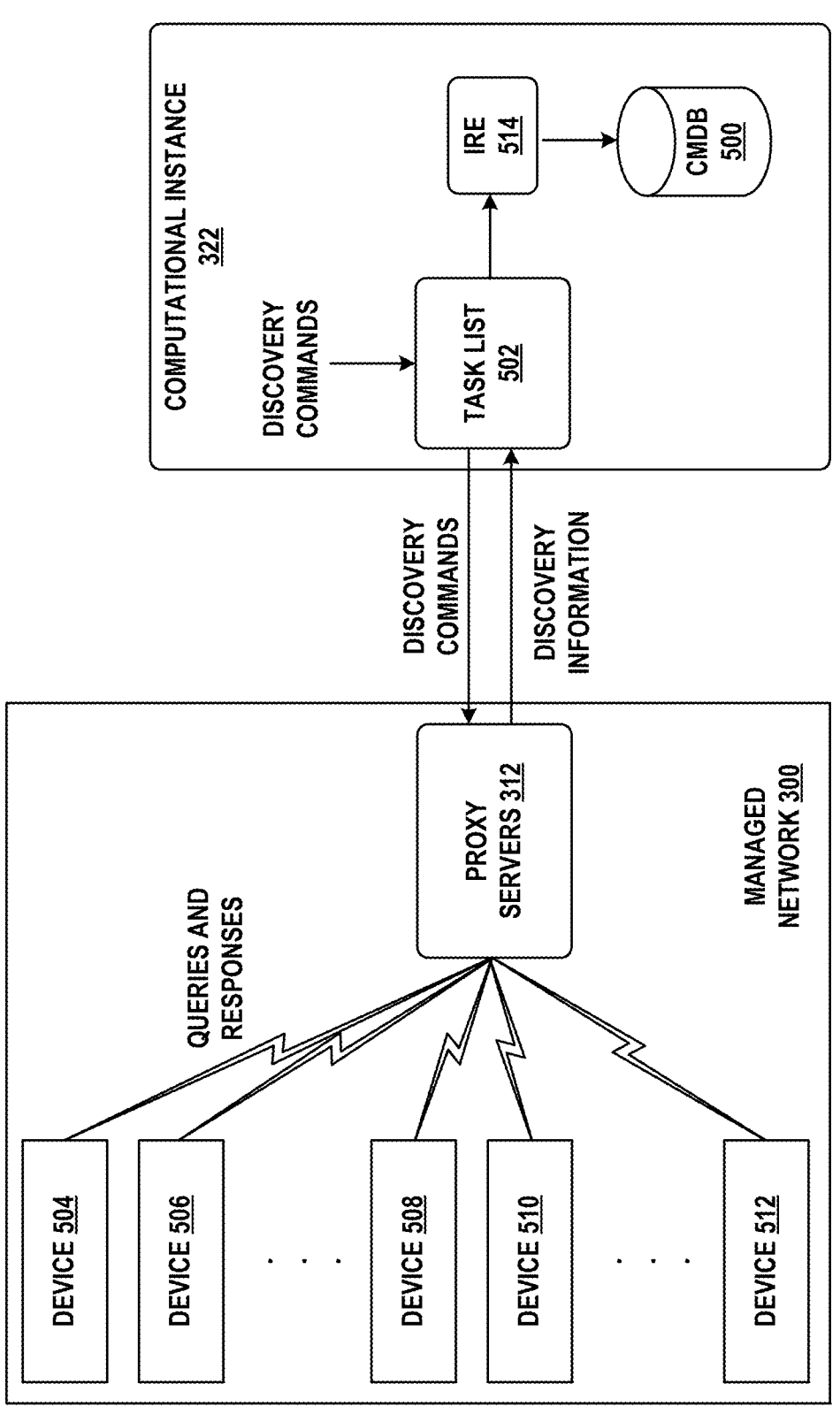
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Example Alert Visual Map Generation

In general, alerts are notifications or warnings generated by a system to inform users or administrators about specific events or conditions that require attention or action. A managed network (such as managed network 300) may perform processing and/or analysis of performance metrics, and comparisons with various thresholds, target levels, and ranges to generate alerts for devices and/or systems. These performance metrics might include processor utilization, memory utilization, network bandwidth, latency, and/or packet loss rates, among other possibilities. By comparing the metrics to predefined thresholds, target levels, or expected ranges, the network can identify deviations or anomalies. When such deviations occur, alerts can be generated to notify administrators or automated systems. In addition, alerts for a given manageable network entity could also indicate a severity level, depending on a degree or amount by which observed (monitored) performance deviates, diverges, or departs from a threshold, target level, or operating range, for example.

In the context of a managed network, alerts may indicate various issues including: performance degradation, security breaches, hardware failures, configuration errors, and service outages, among other possibilities. Performance degradation alerts may be triggered when network performance metrics fall below acceptable levels, such as high latency, increased packet loss, or low bandwidth. Security breach alerts may be generated to warn about potential security threats, such as unauthorized access attempts, malware infections, or suspicious network activity. Hardware failure alerts may be triggered when network devices experience hardware failures or malfunctions, such as router or switch failures, power outages, or hardware overheating. Configuration error alerts may be generated to indicate configuration errors or misconfigurations in network devices or services, which could lead to operational issues or security vulnerabilities. Service outage alerts may be triggered during service outages or disruptions, informing users about the impact and helping prioritize restoration efforts.

As noted above, the systems and methods discussed herein relate to improving the parsing of alerts and assessment of relationships between alerts and/or dependencies to underlying systems. Accordingly, embodiments of the disclosure include generating visual maps of alerts (e.g., from a network, such as managed network 300). Each alert may be associated with various data attributes like severity, source, and tags, among other possibilities. The visual maps visually represent alerts and their relationships, such as connections or links between different alerts indicating shared attributes and/or underlying incidents. The visual maps may also incorporate configuration data (e.g., from a configuration management database like CMDB 500) to provide additional information about associated systems. By highlighting relationships and shared attributes, visual maps facilitate improved understanding of interdependencies and causalities among alerts, leading to more efficient troubleshooting and root cause analysis. This visualization may aid in improved triaging of alerts, quicker incident response times, and a systematic approach to alert management.

Figure 6:
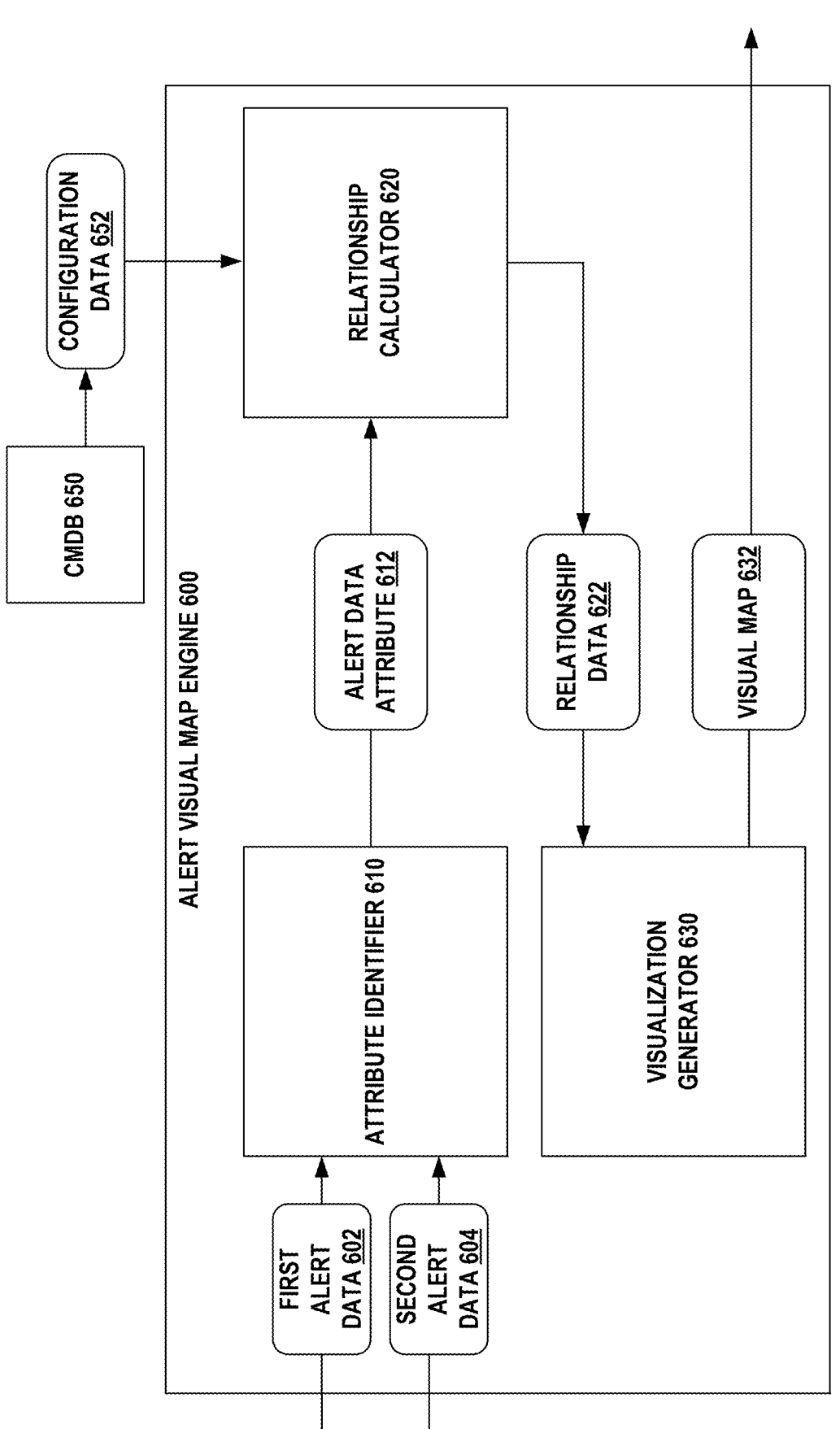
FIG. 6 illustrates a schematic drawing of an alert visual map engine, in accordance with example embodiments.

FIG. 6 illustrates a schematic drawing of an alert visual map engine 600. Alert visual map engine 600 may include attribute identifier 610, relationship calculator 620, and visualization generator 630. CMDB 650 may be an embodiment of CMDB 500, as discussed above in the context of FIG. 5.

Attribute identifier 610 may be configured to obtain first alert data 602 and second alert data 604. Attribute identifier 610 may be configured to determine alert data attribute 612 based on first alert data 602 and second alert data 604, where alert data attribute 612 may be a shared attribute associated with both first alert data 602 and second alert data 604.

First alert data 602 and second alert data 604 may each correspond to an alert from a managed network or another network indicating a deviation or issue with an underlying device and/or system. Each alert data may include a node (or "host") indicating where the alert data was transmitted from, a metric indicating what the issue or underlying incident for the alert is, and/or a source indicating which device and/or system had the issue or underlying incident. For example, first alert data 602 could be alert data indicating that "CPU monitoring system" is the node, "high CPU utilization" is the metric, and "CPU device" is the source. Additionally, the alert data may represent the alert itself and/or include associated information, including alert attributes (e.g., a severity, a timestamp), among other possibilities. For example, first alert data 602 could include the alert data described above ("CPU monitoring system" for the node, "high CPU utilization" for the metric, and "CPU device" for the source) an a timestamp (e.g., "alert issued at 12:01 PM"). As another example, the alert data could include comments or notes from a user, such as "persistent problem, to be discussed."

Attribute identifier 610 may be configured to obtain the alert data from a managed network (e.g., managed network 300), a network monitoring tool, an event log, a performance management platform, a CMDB, an incident management system, and/or a user input, among other possibilities. Attribute identifier 610 may proactively request alerts from one or more of these locations (e.g., if a user requests an alert report), or attribute identifier 610 may receive alert data on a scheduled and/or as-needed basis.

Alert data attribute 612 may be an attribute associated with first alert data 602 and/or second alert data 604. In general, alert attributes represent information associated with an alert that help identify the nature, severity, and/or context of the event or condition triggering the alert, among other possibilities. Some examples of alert attributes include a timestamp, a severity level, a description, affected components, actions required, acknowledgement status, resolution, priority group, state, category, and/or configuration item, among other possibilities. More specifically, a severity level may indicate a level of impact or seriousness of an alert on a network's operation. It may help in understanding the potential consequences of the alert and determining the appropriate response. For instance, a critical severity alert might indicate a network outage affecting multiple users, while an informational severity alert might provide a notification about routine maintenance activities. As another specific example, a state may refer to a current status or condition of an alert. For instance, some states could include "open," "acknowledged," "in progress," and "closed." An open alert could indicate that the alert has been triggered but has not yet been addressed, while an acknowledged alert may signify that it has been seen by an administrator. In progress may indicate that actions are being taken to resolve the alert, and closed could indicate that the alert has been successfully addressed or resolved.

Alert data attribute 612 may refer to the attribute category (e.g., "severity" and/or a value associated with the attribute (e.g., "high"). Alert attribute data 612 may include one or more attributes and/or values. For instance, alert attribute data 612 could include "severity: high" and "state: open." Alert attribute data 612 could additionally include first alert data 602 and/or second alert data 604.

Attribute identifier 610 may be configured determine alert data attribute 612 by one or more of methods, such as obtaining attributes automatically generated by monitoring systems, manually added by users, or through other means. Automatically generated attributes may be derived automatically by monitoring systems or alerting tools based on predefined rules, thresholds, or algorithms. Examples of automatically generated attributes include timestamp, severity level, source, metrics, and state. These attributes could also come from another network or database, such as a CMDB. User-added attributes may be attributes added by a user or administrator, for example to provide more context, categorization, or annotations on an alert. For instance, a user may add notes, comments, or tags to an alert to provide additional details or instructions for resolution. Other possibilities for generating or deriving attributes associated with alerts include advanced analytics, machine learning algorithms, natural language processing (NLP), among other possibilities.

Attribute identifier 610 may be configured to determine alert data attribute 612 corresponding to an attribute of first alert data 602 and/or second alert data 604. In some cases, attribute identifier 610 may be further configured to determine alert data attribute 612 that is shared between first alert data 602 and second alert data 604. For example, if first alert data 602 and second alert data 604 both have a severity of "high," data attribute 612 could be "severity: high" and/or include an indication that the attribute value are shared. For instance, alert data attribute 612 could be: "alerts: 602, 604; severity: high."

Relationship calculator 620 may be configured to determine, based on alert data attribute 612 and possibly configuration data 652, relationship data 622 for first alert data 602 and second alert data 604. Relationship data 622 may be one or more relationship(s) between two or more alerts and/or an alert and an underlying system or device. Relationship data 622 may include the alerts, related attributes, and/or other information. For example, relationship data 622 may include an alert group based on the one or more relationship(s). In general, an alert group may be a set of alerts that have been batched together due to certain similarities. These similarities may be based on there being relationships between the configuration items that have triggered the issuance of these alerts and/or historical data from which correlations between certain types and sources of alerts have been learned. For example, alert groups may be formed for alerts from hosts (virtual or otherwise) on a particular computing device, or processes executing on a particular host.

Relationship calculator 620 may be configured to determine relationship data 622 through various means or methods, including rule-based matching, pattern recognition algorithms, and statistical analysis techniques, among other possibilities. Some of these techniques may include supervised and/or unsupervised machine learning.

For example, rule-based matching may include defining or reference a set of rules or conditions that indicate a relationship between alerts. These rules could be based on specific attribute values, such as severity level, source system, or timestamp proximity. For instance, if two alerts have the same severity level, they may be considered related and/or placed into the same alert group corresponding to the severity attribute. As another example, pattern recognition algorithms may use machine learning algorithms to identify patterns and correlations within the alert data. For instance, a machine learning model could be trained using a plurality of training samples, where each respective training sample of the plurality of training samples includes (i) two related alerts with respective associated attributes and (ii) a corresponding relationship between the alerts. Then, the trained machine learning model could be provided with two new alerts and generate, as output, a predicted relationship between the two alerts. As yet another example, statistical analysis may include conducting statistical analysis to identify correlations and dependencies between alert attributes.

Techniques such as correlation analysis, regression analysis, or time series analysis may indicate relationships between variables, helping to determine if certain attributes co-occur or influence each other. For instance, alerts with a high severity may often have a high priority attribute.

Supervised learning algorithms could be trained on historical data to recognize relationships between alerts based on various features. For instance, classification algorithms like decision trees or neural networks could predict relationships based on previous relationships and/or alert groups. Similarly, unsupervised learning algorithms may be used to detect patterns in alert data or alert groups. For instance, clustering algorithms like k-means could identify relationships between alerts and/or group similar alerts together. Additionally or alternatively, NLP techniques may be used to extract relevant information and identify relationships based on textual content. This could involve keyword extraction, sentiment analysis, or topic modeling to uncover common themes or issues across alerts.

Relationship calculator 620 may be further configured to determine a causal relationship based on alert data attribute 612. Known causal associations may be established based, for example, on known functional dependencies between various network entities whose respective performances are tracked by a set of alerts. The alerts of the set may thus be grouped based on the known dependencies. The knowledge of the functional dependencies could be based known network configurations of the network entities and/or known operational flow between network entities, for example. In some examples, this information could be recorded in a CMDB, such as CMDB 650. Empirically-derived causal associations may be established based on observations of alerts over time. For example, it may be observed by operations management personnel that certain alerts tend to occur in a fixed or nearly-fixed sequence. This observation may then suggest grouping these certain alerts together.

Relationship calculator 620 may be configured to obtain configuration data 652 from CMDB 650 and additionally or alternatively determine relationship data 622 based on configuration data 652. More specifically, relationship calculator may use configuration data 652 from CMDB 650 to perform, for example, data integration, attribute matching, attribute mapping, hierarchical grouping, and/or dynamic grouping, among other possibilities. Attribute matching and mapping may include identification of attributes from configuration data, such as server names, IP addresses, operating systems, hardware specifications, installed software, and other configuration details, and/or mapping configuration attributes to attributes within the alert data. For example, matching a server name or IP address from configuration data with a source system attribute in the alert data. Hierarchical grouping may include, for example, grouping alerts related to a specific server under a parent node representing that server, and further sub-grouped alerts based on specific attributes or configurations.

In some cases, relationship data 622 may represent relationships and or grouping based on configuration data 652 and/or alert data attribute 612. For example first alert data 602 may be related to configuration data 652, and relationship data 622 could represent that relationship. As another example, first alert data 602 and second alert data 604 may both be related to configuration data 652, and relationship data 622 could represent that relationship. As another example, first alert data 602 and second alert data 604 could both be related by alert data attribute 612 and configuration data 652, and relationship data 622 could represent that relationship. Other possibilities exist. In some cases, configuration data 652 may be used to augment or enhance relationship data 622, for instance by providing additional attributes and/or configuration items that are shared and/or different between first alert data 602 and second alert data 604.

As a concrete example, suppose the network manages a system including server X, a CPU monitoring system for server X, and a CMDB that stores configuration information about server X. First alert data 602 could represent an alert such as "high CPU usage on server X" and second alert data 604 could represent an alert such as "low disk space on server X." Configuration data 652 could represent information such as "server X has 8 CPU cores and 1 TB of disk space." Alert data attribute 612 could represent "source: server X." Configuration data 652 could be used to augment relationship data 622, for example by including information that first alert data 602 is related to server X's 8 CPU cores, while second alert data 604 is related to server X's 1 TB of disk space. This augmentation may allow for more granular alert and relationship analysis and/or grouping of alerts.

Visualization generator 630 may be configured to generate, based on relationship data 622, visual map 632. Visual map 632 may include a representation of first alert data 602, a representation of second alert data 604 and/or a representation of relationship data 622.

Visual map 632 may include, for example, a graphical network diagram, a timeline visualization, a heatmap, a hierarchical tree, a cluster diagram, and/or an interactive dashboard, among other possibilities. A graphical network diagram could include nodes representing alerts, systems, or configuration items, with edges representing relationships between each node, and different colors, shapes, or sizes of nodes and edges could indicate attributes or strengths of relationships. A timeline visualization could represent alerts along a timeline, where relationships between alerts are shown as connections or annotations on the timeline, which may facilitate presentation of temporal information. A heatmap could include alerts represented as cells in a grid, where an intensity of color indicates a strength or frequency of relationships between alerts. A hierarchical tree could include alerts organized in a tree structure based on their relationships, which may facilitate root-cause analysis, for instance if two alerts are from a shared source. Cluster diagrams could include alerts grouped into clusters based on their relationships. An interactive dashboard could enable a user to customize the visualization by selecting specific alerts or entities to display, and filters or search functions could facilitate a user to focus on specific areas of interest.

Visualization generate 630 may be configured to generate visual map 632 for presentation on a graphical user interface (GUI) or other mediums, including web-based interfaces, mobile applications, desktop applications, as embeddings or APIs in an existing workflow, among other possibilities. Visual map 632 could additionally or alternatively include a list, spreadsheet, text, or other information summarizing or representing visual elements. For instance, a cluster diagram could include a legend with comments about how alerts are clustered. As another example, a graphical network diagram could include a full list of all alerts, with an ability to filter or select certain alerts in the list and/or in a graphical portion of the diagram.

Visual map 632 may be interactive, and include filtering or sorting features as discussed above. Additionally or alternatively, visual map 632 could include features for alert analysis or incident response. For example, visual map 632 could include a feature that enables a user to assign an alert to another user. As another example, visual map 632 could include a feature that enables a user to request more information about an alert. As another example, visual map 632 could include a feature that enable a user to prompt a system or device to take a proactive response to an alert and/or underlying incident. For instance, if visual map 632 suggests that multiple alerts are stemming from a particular server, visual map 632 could include a feature to allow a user to restart that server.

Visual map 632 may provide a method for quickly analyzing relationships between alerts, sorting them, and identifying the root causes of incidents, as well as enabling faster and more efficient responses. By automatically determining attributes associated with alert data and connections between alerts efficiently, as well as augmenting this analysis with information form a CMDB, visual map 632 enables rapid identification of alert relationships and potential root causes, leading to improved incident response and reduced downtime.

FIG. 7 depicts an example embodiment, with alert 700 and alert 710. Alert 700 has attributes including a priority group, a severity, a state, a configuration item, and a category, with corresponding values of urgent, 1-Critical, Open, Web Server, and Default. Alert 700 also includes a message of "Cannot connect to database." Alert 710 has attributes including a priority group, a severity, a state, a configuration item, and a category, with corresponding values of urgent, 1-Critical, Open, Web Server, and Default. Alert 710 also includes a message of "No network detected." These alerts may suggest that there may be an internet outage or network failure relating to the web server.

Figure 8:
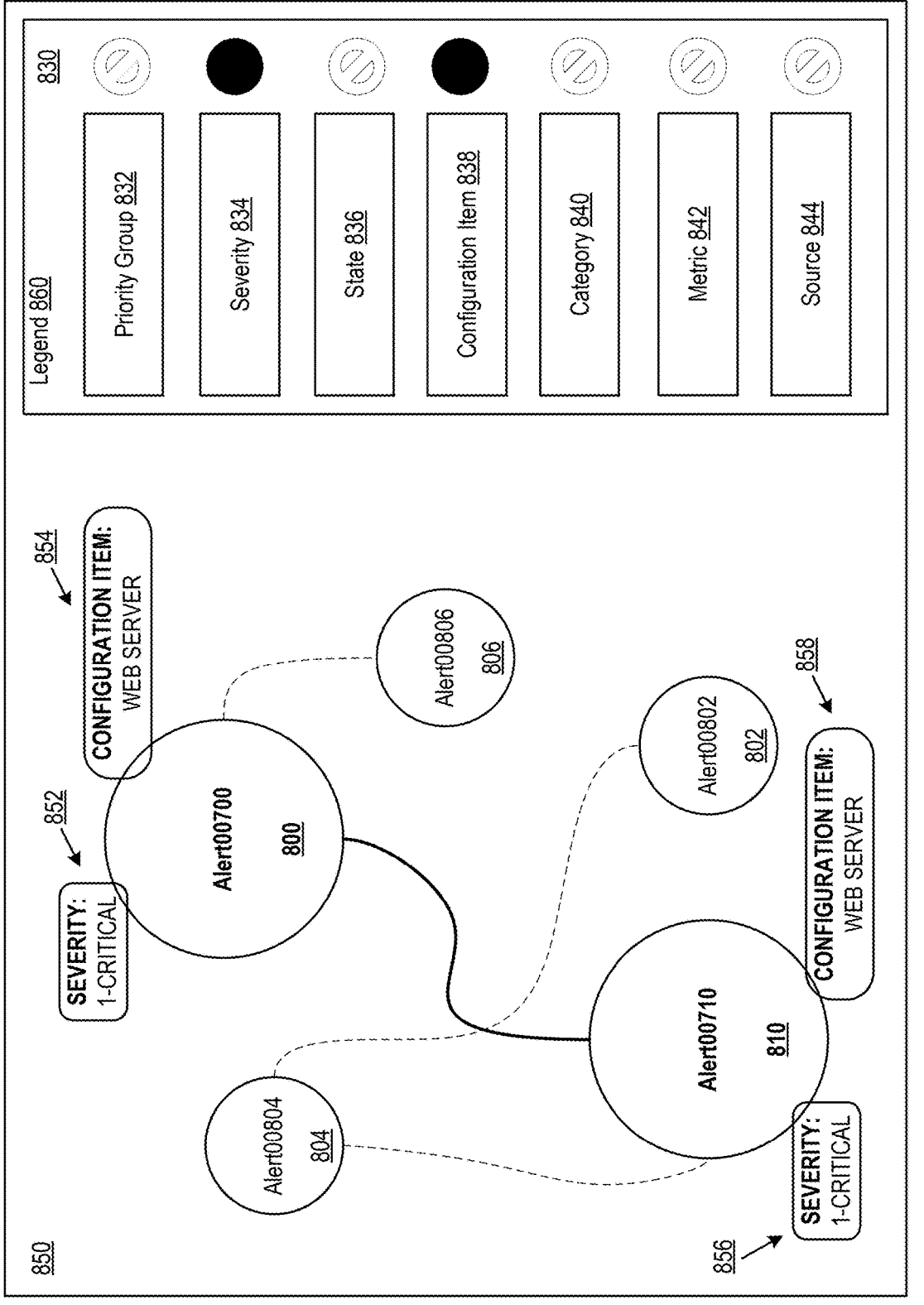
FIG. 8 depicts a visual map, in accordance with example embodiments.

FIG. 8 depicts an example visual map 850 corresponding to alert 700 and alert 710 of FIG. 7. Visual map 850 includes alert representation 800 of alert 700, alert representation 810 of alert 710, as well as alert representation 802, alert representation 804, and alert representation 806 of other alerts. Alert representation 800 is associated with label 852 and label 854, and alert representation 810 is associated with label 856 and label 858. Visual map 850 also includes legend 860, with toggles 830 for each attribute: priority group 832, severity 834, state 836, configuration item 838, category 840, metric 842, and source 844. In this embodiment, severity 834 and configuration item 838 attributes are toggled as visible, causing labels 852, 854, 856, and 858 appear as associated with their respective alert representations.

Since alert 700 and alert 710 share the same severity (1-Critical) and the same configuration item (Web Server), and those are the two attributes toggled as visible visual map 850 is configured to make alert representation 800 and alert representation 810 larger and connect them with a solid line. The other alert representations 802, 804, 806 may represent alerts that do not share these attributes (e.g., all are lower severity and for a different configuration item). Accordingly, their representations are not larger. The dotted lines (e.g., connecting alert representation 804 and alert representation 810) may correspond to those alerts sharing a different attribute that is not toggled as visible (e.g., both could be from the same source).

Visual map 850 may enable more rapid and/or efficient analysis of the relationship between alert 700 and alert 710 by indicating that both are related to the same web server, suggesting that the web server could be the root cause of the incident. Visual map 850 could also enable more rapid responses to this deficiency, by, for example, automatically (or user-prompting causing a system to begin) initiating a restart process for the web server and/or other devices or components on a network. Accordingly, visual map 850 may improve response times and reduce the resources needed to respond to service disruptions and outages.

Putting FIGS. 7 and 8 in the context of FIG. 6, alert 700 and alert 710 could be represented by first alert data 602 and second alert data 604, respectively. Attribute identifier 610 could determine a shared attribute of "severity," which would be represented by alert data attribute 612. Relationship calculator 620 could receive the configuration item of "Web Server" for each alert, which could be represented as configuration data 652. Relationship calculator 620 could determine a relationship between the two alerts based on alert data attribute 612 and configuration data 652, in this case that alert 700 and alert 710 have the same severity and the same configuration item, suggesting they may be grouped accordingly. These relationships and/or group could be represented by relationship data 622. Visualization generator 630 could generate visual map 850 based on the alert information and relationship information, corresponding to visual map 632.

Visual map 850 and other visualizations as described herein are meant as illustrative examples of possible visualizations. Other visual maps and/or visualizations are possible and within the scope of this disclosure. In some examples, visualizations could include toggles to control display elements. In some examples, visualizations may display attributes but not the associated alert representations, among other possibilities.

VIII. Example Operations

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may include obtaining first data indicating a first service degradation in a network, and obtaining second data indicating a second service degradation in the network.

Block 902 may include identifying a field that is associated with the first data and the second data. Identifying a common field associated with both service degradations may enable an association to be established between the service degradations. This determination may enhance the accuracy and efficiency of identifying patterns or correlations within the network, aiding in root cause analysis and proactive resolution.

Block 904 may include determining, based on the field, a relationship between the first data and the second data. Determining the relationship between the service degradations based on the identified field may provide additional information about the association between the service degradations. This may enable an identification of how different network elements are interconnected and how issues propagate, facilitating more effective troubleshooting and remediation.

Block 906 may include generating a representation of a user interface including the first data, the second data, and the relationship, where the user interface includes toggles that control display of a plurality of fields associated with the first data and the second data including the field. The visualization may aid in quickly displaying a state of the network, identifying trends, and managing service degradations, ultimately leading to faster incident resolution and improved network management efficiency. Additionally, the toggles for displaying various fields may offer flexibility and customization options, and may enable an improved representation of how service degradations are related and/or interdependent based on toggled fields. Any of these improvements can result in fewer computing resources being needed to resolve service degradations as well as the service degradations being resolved more quickly, thereby wasting fewer computing resources.

Some embodiments may further include identifying a second field that is associated with the first data and the second data, where the second field includes configuration data for the network, and determining, based on the second field, a second relationship between the first data and the second data, where the plurality of fields includes the second field.

In some embodiments, the first data is obtained from a first monitoring system of the network and the second data is obtained from a second monitoring system of the network. Determining the field includes obtaining a common value for the field from the first monitoring system and the second monitoring system.

In some embodiments, identifying the field may include obtaining a first plurality of fields associated with the first data, where the first plurality of fields includes the field, obtaining a second plurality of fields associated with the second data, where the second plurality of fields includes the field, and determining the field based on a pairwise comparison of values within the first plurality of fields and the second plurality of fields. In some further embodiments, the first plurality of fields contains values representing a first node, a first metric, and a first source. The plurality of fields contains values representing a second node, a second metric, and a second source, and the field is one which has a shared value between the first plurality of fields and the second plurality of fields.

In some embodiments, a portion of the network is stored in a configuration management database, where the relationship is causal and the relationship is determined based on a functional dependency, and where the functional dependency is based on configuration data stored in the configuration management database.

In some embodiments, determining the relationship may include determining a group for the first data and the second data, where the group is based on historical data indicating a correlation between the first service degradation and the second service degradation.

In some embodiments, determining the relationship may include providing, as input to a trained machine learning model, the first data and the second data and receiving, as output from the trained machine learning model, the relationship. The trained machine learning model is trained using a plurality of training samples, where each respective training sample of the plurality of training samples include one or more service degradations, associated data indicating each service degradation, and a corresponding relationship between the one or more service degradations.

In some embodiments, the user interface includes a visual map, where the visual map includes a first node representing the first data, a second node representing the second data and a link between the first node and the second node, where the link represents the relationship. In some further embodiments, the user interface includes a list including the first data and the second data.

Some embodiments may further include obtaining an input from the user interface, where the input represents a resolution action for the first service degradation or the second service degradation, executing the resolution action, and updating the user interface to indicate the execution of the resolution action. In some further embodiments, the resolution action includes restarting one or more devices within of the network.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include nontransitory computer readable media such as non-transitory computer readable media like register memory, processor cache, RAM, ROM, optical or magnetic disks, solid-state drives, or compact disc read only memory (CD-ROM), for example. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
obtaining first data indicating a first service degradation in a network, and obtaining second data indicating a second service degradation in the network;
identifying a field that is associated with the first data and the second data;
determining, based on the field, a relationship between the first data and the second data, wherein a portion of the network is stored in a configuration management database, wherein the relationship is a causal relationship determined based on a functional dependency, wherein the functional dependency is based on configuration data stored in the configuration management database;
identifying a second field that is associated with the first data and the second data, wherein the second field comprises configuration data for the network;
determining, based on the second field, a second relationship between the first data and the second data; and
generating a representation of a user interface including the first data, the second data, the relationship, and the second relationship, wherein the user interface includes a control element to control display of a plurality of fields associated with the first data and the second data including the field and the second field.

2. The method of claim 1, wherein the first data is obtained from a first monitoring system of the network and the second data is obtained from a second monitoring system of the network, and wherein determining the field comprises obtaining a common value for the field from the first monitoring system and the second monitoring system.

3. The method of claim 1, wherein identifying the field comprises:
obtaining a first plurality of fields associated with the first data, wherein the first plurality of fields comprises the field;
obtaining a second plurality of fields associated with the second data, wherein the second plurality of fields comprises the field; and
determining the field based on a pairwise comparison of values within the first plurality of fields and the second plurality of fields.

4. The method of claim 3, wherein the first plurality of fields contains values representing a first node, a first metric, and a first source, wherein the plurality of fields contains values representing a second node, a second metric, and a second source, and wherein the field is one which has a shared value between the first plurality of fields and the second plurality of fields.

5. The method of claim 1, wherein determining the relationship comprises determining a group for the first data and the second data, wherein the group is based on historical data indicating a correlation between the first service degradation and the second service degradation.

6. The method of claim 1, wherein determining the relationship comprises:
providing, as input to a trained machine learning model, the first data and the second data; and
receiving, as output from the trained machine learning model, the relationship,
wherein the trained machine learning model is trained using a plurality of training samples, wherein each respective training sample of the plurality of training samples comprises:
one or more service degradations;
associated data indicating each service degradation; and
a corresponding relationship between the one or more service degradations.

7. The method of claim 1, wherein the user interface comprises a visual map, wherein the visual map includes:
a first node representing the first data;
a second node representing the second data; and
a link between the first node and the second node, wherein the link represents the relationship.

8. The method of claim 7, wherein the user interface comprises a list including the first data and the second data.

9. The method of claim 1, further comprising:
obtaining an input from the user interface, wherein the input represents a resolution action for the first service degradation or the second service degradation;
executing the resolution action; and
updating the user interface to indicate the execution of the resolution action.

10. The method of claim 9, wherein the resolution action comprises restarting one or more devices within of the network.

11. A non-transitory computer-readable medium, having stored thereon program instructions that, upon execution by a computing system, cause the computing system to perform operations comprising:
obtaining first data indicating a first service degradation in a network, and obtaining second data indicating a second service degradation in the network;
identifying a field that is associated with the first data and the second data;
determining, based on the field, a relationship between the first data and the second data, wherein a portion of the network is stored in a configuration management database, wherein the relationship is a causal relationship determined based on a functional dependency, wherein the functional dependency is based on configuration data stored in the configuration management database;
identifying a second field that is associated with the first data and the second data, wherein the second field comprises configuration data for the network;
determining, based on the second field, a second relationship between the first data and the second data; and generating a representation of a user interface including the first data, the second data, the relationship, and the second relationship, wherein the user interface includes a control element to control display of a plurality of fields associated with the first data and the second data including the field and the second field.

12. The non-transitory computer-readable medium of claim 11, wherein the first data is obtained from a first monitoring system of the network and the second data is obtained from a second monitoring system of the network, and wherein determining the field comprises obtaining a common value for the field from the first monitoring system and the second monitoring system.

13. The non-transitory computer-readable medium of claim 11, wherein identifying the field comprises:

obtaining a first plurality of fields associated with the first data, wherein the first plurality of fields comprises the field;

obtaining a second plurality of fields associated with the second data, wherein the second plurality of fields comprises the field; and determining the field based on a pairwise comparison of values within the first plurality of fields and the second plurality of fields.

14. The non-transitory computer-readable medium of claim 11, wherein determining the relationship comprises determining a group for the first data and the second data, wherein the group is based on historical data indicating a correlation between the first service degradation and the second service degradation.

15. The non-transitory computer-readable medium of claim 11, wherein determining the relationship comprises:

providing, as input to a trained machine learning model, the first data and the second data; and receiving, as output from the trained machine learning model, the relationship, wherein the trained machine learning model is trained using a plurality of training samples, wherein each respective training sample of the plurality of training samples comprises:

one or more service degradations;

associated data indicating each service degradation; and a corresponding relationship between the one or more service degradations.

16. A system comprising:

one or more processors; and memory, containing program instructions that, upon execution by the one or more processors, cause the system to perform operations comprising:

obtaining first data indicating a first service degradation in a network, and obtaining second data indicating a second service degradation in the network;

identifying a field that is associated with the first data and the second data;

determining, based on the field, a relationship between the first data and the second data, wherein a portion of the network is stored in a configuration management database, wherein the relationship is a causal relationship determined based on a functional dependency, wherein the functional dependency is based on configuration data stored in the configuration management database;

identifying a second field that is associated with the first data and the second data, wherein the second field comprises configuration data for the network;

determining, based on the second field, a second relationship between the first data and the second data; and generating a representation of a user interface including the first data, the second data, the relationship, and the second relationship, wherein the user interface includes a control element to control display of a plurality of fields associated with the first data and the second data including the field and the second field.

17. The system of claim 16, wherein the first data is obtained from a first monitoring system of the network and the second data is obtained from a second monitoring system of the network, and wherein determining the field comprises obtaining a common value for the field from the first monitoring system and the second monitoring system.

18. The system of claim 16, wherein identifying the field comprises:

obtaining a first plurality of fields associated with the first data, wherein the first plurality of fields comprises the field;

obtaining a second plurality of fields associated with the second data, wherein the second plurality of fields comprises the field; and determining the field based on a pairwise comparison of values within the first plurality of fields and the second plurality of fields.

19. The system of claim 16, wherein determining the relationship comprises determining a group for the first data and the second data, wherein the group is based on historical data indicating a correlation between the first service degradation and the second service degradation.

20. The system of claim 16, wherein determining the relationship comprises:

providing, as input to a trained machine learning model, the first data and the second data; and receiving, as output from the trained machine learning model, the relationship, wherein the trained machine learning model is trained using a plurality of training samples, wherein each respective training sample of the plurality of training samples comprises:

one or more service degradations;

associated data indicating each service degradation; and a corresponding relationship between the one or more service degradations.

* * * * *